April 24, 1951 W. H. BISHOP 2,550,323
SLIDING ROOF FOR VEHICLES
Filed Jan. 4, 1949 2 Sheets-Sheet 1
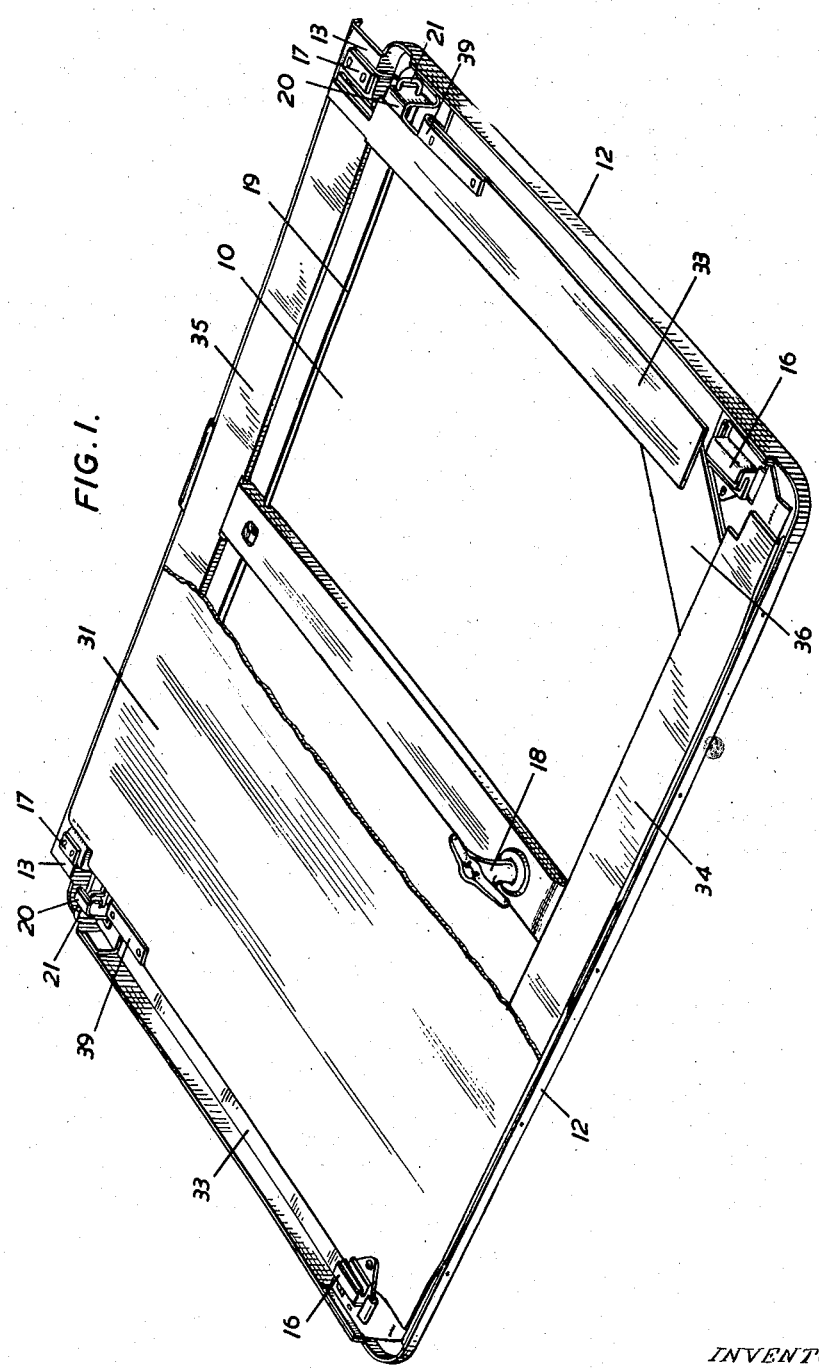
INVENTOR.
William Henry Bishop
BY Walter S. Pleston
ATTORNEY April 24, 1951  W. H. BISHOP  2,550,323
SLIDING ROOF FOR VEHICLES
Filed Jan. 4, 1949  2 Sheets-Sheet 2
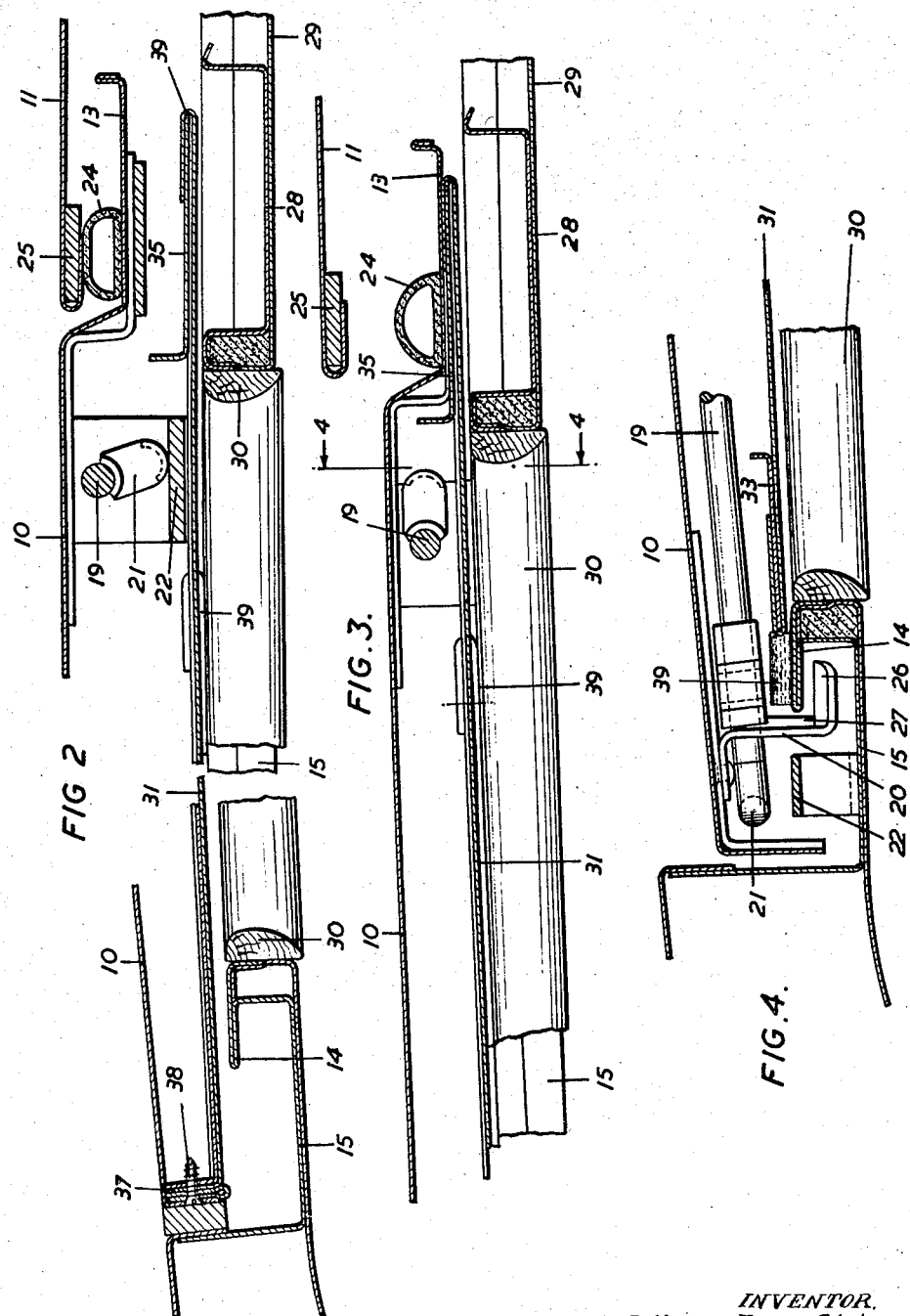
INVENTOR.
William Henry Bishop
BY Walter S. Bleston
ATTORNEY Patented Apr. 24, 1951

2,550,323

UNITED STATES PATENT OFFICE 2,550,323

SLIDING ROOF FOR VEHICLES

William Henry Bishop, Birmingham, England, assignor to Weathershields Limited, Birmingham, England, a company of Great Britain Application January 4, 1949, Serial No. 69,130
In Great Britain January 17, 1948

2 Claims. (Cl. 296—137)

This invention relates to improvements in sliding roofs for vehicles of the type in which an opening in the front part of the roof is adapted to be closed or to be uncovered to any desired extent by a longitudinally slidable panel mounted on the roof, the panel when opened sliding under a fixed canopy forming the rear part of the roof.

To allow the panel to slide under the canopy when opened and yet be flush with the roof when closed the rear edge of the panel is movable vertically and is controlled from the locking means for the panel in such a manner that when the panel is unlocked preparatory to opening the roof the rear edge of the panel is dropped below the level of the canopy and when the panel is closed and locked its rear edge is raised to bring the panel flush with the surrounding parts of the roof.

If the sliding panel is a single member, then, as a result of the lifting of the rear edge of the panel in the closed position a gap of substantial width would be left between the usual cloth or other headlining secured to the bottom surface of the panel and the upper surface of the flanged watercheck frame which surrounds the roof opening and on which the panel is guided. This gap would detract from the appearance of the roof from the inside, and in my U. S. Patent No. 2,132,228 I have described a sliding roof in which this difficulty is overcome by making the panel in two parts, namely a rigid upper panel which, when closed, lies flush with the upper surface of the roof and a lower or base panel of plywood or similar material which is slidably guided on the flanges of the watercheck frame so that it has a plain horizontal sliding movement, the two panels being connected only at their front ends so that the rear edge of the upper panel can be raised relative to the base panel.

According to my invention the head lining for the sliding panel of a roof of the type set forth above is carried by a light frame which is attached to the panel at its front end only and the remainder of which rests freely under gravity on the guides for the panel, and when the rear edge of the panel is raised in the closing and locking movement the head lining does not rise with it but remains in contact with the watercheck frame around the roof opening so that there is no visible gap between the panel and the surrounding part of the roof on the inside.

The frame carrying the head lining may be formed by light flexible steel strips of which two extend longitudinally along the sides and are secured by screws or other fastening means at their front ends to the underside of the panel and a third which extends across the back and is welded or otherwise secured to the rear ends of the side strips.

In another arrangement the head lining may be carried by a thin sheet of metal, fibre or other suitable material of substantially the same area as the sliding panel, the front edge of the sheet being secured to the underside of the panel.

In another arrangement the frame carrying the head lining may be rigid and may be hinged at its front edge to the sliding panel.

In any of these forms the front edge of the head lining may be carried on to and secured to the front edge of the sliding panel.

The rear edge of the frame carrying the head lining is left quite free so that it simply rests under gravity and slides on the upper surface of the watercheck frame at each side of the roof opening.

One practical embodiment of my invention illustrated by way of example in the accompanying drawings in which:

Figure 1 is a perspective view of the underside of a sliding roof panel embodying the invention, a part of the head lining being cut away.

Figure 2 is a longitudinal section partially broken away of the panel in position in a vehicle roof, the panel being in the raised and locked position.

Figure 3 is a fragmentary longitudinal section showing the panel dropped ready to slide under the rear canopy of the roof.

Figure 4 is a fragmentary section through one side of the panel and the adjacent part of the roof on the line 4—4 of Figure 3.

In the drawings 10 is a sliding panel which is adapted to be mounted in the roof of a vehicle and to be slid longitudinally on guides at the sides of the roof to close an opening in the front part of the roof or to uncover the opening to any desired extent as is well known in the art. When the panel is moved rearwardly it slides under a fixed canopy 11 forming the rear part of the roof, and to allow the panel to do so and yet be flush with the roof when closed the rear edge of the panel is movable vertically by means controlled from a locking handle on the panel. The arrangement is such that when the panel is unlocked preparatory to opening the roof the rear edge of the panel is dropped below the level of the canopy and when the panel is closed and locked its rear edge is raised to bring the panel flush with the surrounding part of the roof.

A sliding roof of that type is described and illustrated in U. S. Patent No. 2,156,615.

The sliding panel 10 as shown in the drawings is a rectangular sheet steel pressing with an integral downwardly extending flange 12 around its front and side edges and an integral channel 13 on its rear edge. The guides for the panel are formed by outwardly directed flanges 14 on a channel-section watercheck frame 15 extending across the front and along each side of the opening in the roof and continuing along each side of the roof under the fixed canopy 11 which forms the rear part of the roof. Felt-lined sliders 16 are mounted on the panel at each side adjacent the front edge for engagement with the guide flanges 14, and adjacent the rear edge of the panel pads 17 are provided to slide on the upper surface of the flanges 14 during the opening movement of the roof.

For raising and lowering the rear edge of the panel a rotatable handle 18 adjacent the front end of the panel is coupled through linkage to a crank on a transverse rod 19 mounted for angular movement on the panel adjacent the rear end thereof. The ends of the rod extend through brackets 20 on the underside of the panel and are formed with cranked terminal portions 21. When the panel is closed these cranked portions 21 overlie raised platforms or ramps 22 (Fig. 4) in the watercheck frame and when the rod 19 is partially rotated by the handle the cranked portions 21 are forced against the platforms to raise the rear edge of the panel into a position flush with the canopy 11 as shown in Figure 2.

In this position of the panel a rubber sealing strip 24 in the channel 13 is urged upwardly against a cross strip 25 at the front edge of the canopy to make a draught-proof seal. Any water which enters the channel 13 drains away to each side into the side members of the watercheck frame from which it is taken away by the usual drain tubes in the body pillars.

When the panel is in the raised position it is locked by the engagement of pads 26 on the brackets 20 with the underside of the flanges 14. Further pads 27 on the vertical parts of the brackets serve to guide the rear part of the panel by engagement with the edges of the flanges 14 but do not interfere with its vertical movement.

At the rear end of the opening in the roof there is a transverse cross member 28 of channel section which extends between the side members of the watercheck frame and to which the front end of the cloth head-lining 29 for the rear part of the roof is attached, this member being spaced vertically from the canopy 11 by a distance sufficient to allow for the vertical movement of the rear end of the panel and to allow the panel when opened to slide into the space between the head-lining and the canopy.

The opening in the roof is finished off with a polished wood or other fillet or moulding 30 secured to the watercheck frame and to the rear cross-member 28.

The panel itself has a fabric head-lining 31 to match the head-lining 29 of the roof.

It will be appreciated from Figure 2 that if this head-lining 31 were fixed to the underside of the panel, as has hitherto been the practice, then when the rear end of the panel is raised into the closed position there would be a substantial gap between the head-lining and the upper surface of the watercheck frame and the rear cross-member 28.

According to the invention the head-lining 31 is carried by a light skeleton frame which is substantially co-extensive with the panel and is attached at its front edge only to the panel so that the rear part of the head-lining does not rise and fall with the panel but rests on and remains continuously in contact with the watercheck frame.

Thus when the panel is in the closed position and its rear end is raised as shown in Figure 2 the head-lining and its frame do not rise and there is no visible gap between the panel and the watercheck frame.

When the rear end of the panel is lowered preparatory to being slid rearwardly the panel simply drops down into engagement with the frame of the head-lining as shown in Figure 3.

In the arrangement illustrated the frame carrying the head-lining is formed from two sheet metal side strips 33, 33, of light gauge and front and rear strips 34, 35, suitably secured together. The front strip is connected to the side strips by angle plates or strips 36 to clear the front sliders 16. The front strip has an upstanding lip 37 at its front edge which is secured to the front edge of the panel 10 by screws 38. The weight of the frame and the flexibility of the side strips 33 are sufficient to keep the frame continuously in contact with the watercheck frame. Leather pads 39, 39, are fitted to the frame at each side near its rear end to rub on the watercheck frame and to avoid wear of the headlining.

In a modification the front strip 34 of the frame may be omitted and the front ends of the side strips 33, 33 may be secured to the underside of the panel.

In another modification the frame carrying the head-lining may be rigid and may be hinged at its front edge to the front of the sliding panel.

I claim:

1. A sliding roof of the kind set forth for a vehicle comprising longitudinal guides secured along the sides and rearward of an opening in the roof of the vehicle, a cross member extending between said guides and defining the rear end of said opening, a slidable panel engaging said guides and adapted to close and uncover said opening, said panel including a stepped-down rear portion, a rubber strip attached to the top of said stepped-down portion, an eccentric means journaled to said panel, a piece rigidly connected to said roof and engageable by said eccentric means when said panel is in a position to close said opening, said eccentric means when in registry with said piece being operative by the user to bear on said piece, thereby to raise the rear end of said panel so as to urge said rubber strip sealingly against said cross member, a light flexible frame below and substantially co-extensive with said panel, and a head lining carried by said frame, said frame being connected to said panel at its front end only and its rear end resting freely under gravity on said guides.

2. A sliding roof of the kind set forth for a vehicle comprising lengtiudinal guides secured along the sides of an opening in the roof of the vehicle, a slidable cover for said opening including an upper and a lower panel, said panels being connected at their fronts only so that the spacing of their rear ends is variable, said upper panel engaging said guides and said lower panel resting freely under gravity on said guides, said upper panel including a stepped-down rear portion, a rubber strip attached to the top of said stepped-down portion, an eccentric means journaled to said upper panel, and a piece rigidly connected to said roof and engageable by said eccentric means when said cover is in a position to close said opening, said eccentric means when in registry with said piece being operative by the user to bear on said piece, thereby to raise the rear end of said upper panel so as to urge said rubber strip sealingly against a portion of said roof.

WILLIAM HENRY BISHOP.

REFERENCES CITED

The following references are of record in the file of this patent:

UNITED STATES PATENTS

| Number | Name | Date |
|---|---|---|
| 2,132,228 | Bishop | Oct. 4, 1938 |
| 2,156,615 | Bishop | May 2, 1939 |